Dec. 25, 1923.  1,478,656

J. JAMISON

CLUTCH

Filed Oct. 22, 1920  2 Sheets-Sheet 1

Inventor

J. JAMISON

By Mason Fenwick Lawrence
Attorneys

Dec. 25, 1923.

J. JAMISON 1,478,656

CLUTCH

Filed Oct. 22, 1920   2 Sheets-Sheet 2

Inventor

J. JAMISON

By Mason Fenwick & Lawrence
Attorneys

Patented Dec. 25, 1923.

1,478,656

UNITED STATES PATENT OFFICE.

JOHN JAMISON, OF LAFAYETTE, COLORADO.

CLUTCH.

Application filed October 22, 1920. Serial No. 418,782.

*To all whom it may concern:*

Be it known that I, JOHN JAMISON, a citizen of the United States, residing at Lafayette, in the county of Boulder and State of Colorado, have invented certain new and useful Improvements in Clutches; and I do hereby declare the following to be a full, clear, and exact description of the invention, such as will enable others skilled in the art to which is appertains to make and use the same.

This invention relates to new and useful improvements in clutches and more particularly to a device adapted to be used between the engine or driving mechanism and the driven mechanism, the main object of the present invention being the provision of means whereby a relief is established between the driving and driven parts whereby to eliminate the jars and strains in case of sudden acceleration of the driven parts, as when, by unevenness or sudden downward pitch in the road, an automobile is sent ahead so that the driven parts of the mechanism revolve faster than the driving parts.

Another object of the present invention is the provision of a clutch including a movable auxiliary portion adapted for engagement with the driving and driven portions respectively, and forming a connection between said portions but permitting substantially a full revolution of one of said portions in relation to the other before establishing engagement between said portions.

A further object of the invention is the provision of a clutch mechanism wherein an auxiliary portion is movably disposed with respect to the driving and driven portions of the clutch and provided with suitable friction brake mechanism to retard the relative movement of these two portions when coming into operative engagement.

With the above and other objects in view, the invention consists in the novel features of construction, the combination and arrangement of parts hereinafter more fully set forth, pointed out in the claims and shown in the accompanying drawings, in which—

Figure 1:
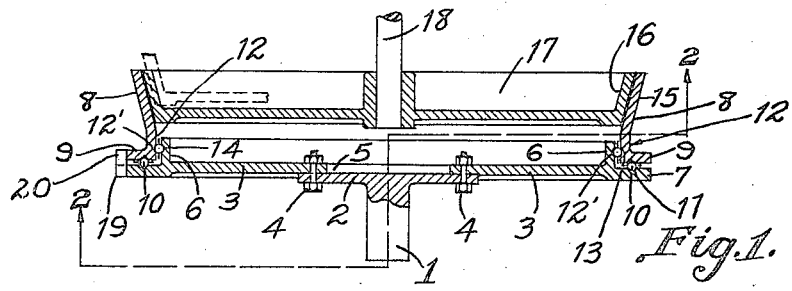
Figure 2:
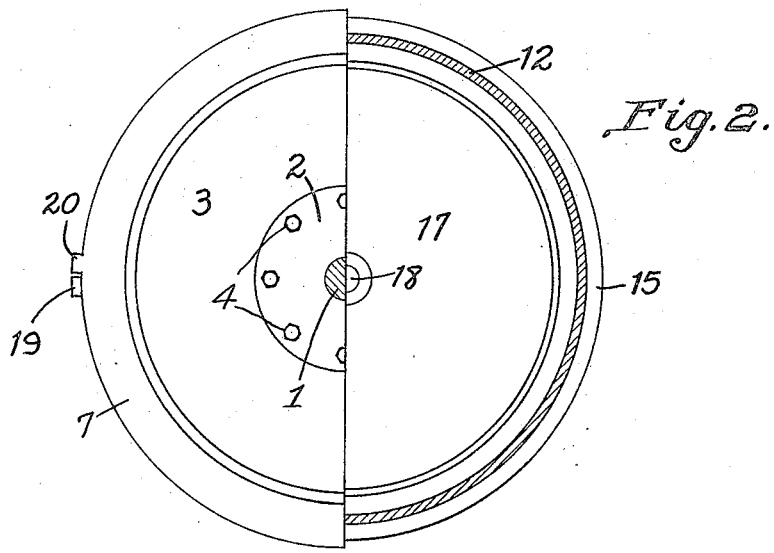
Figures 3, 4:
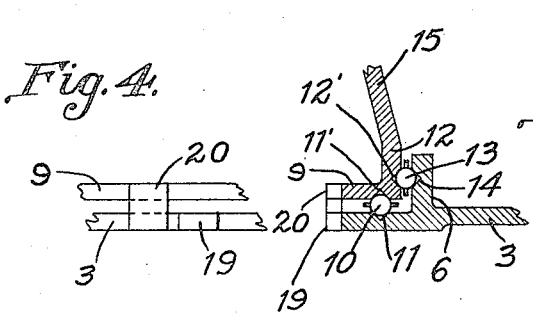
Figure 6:
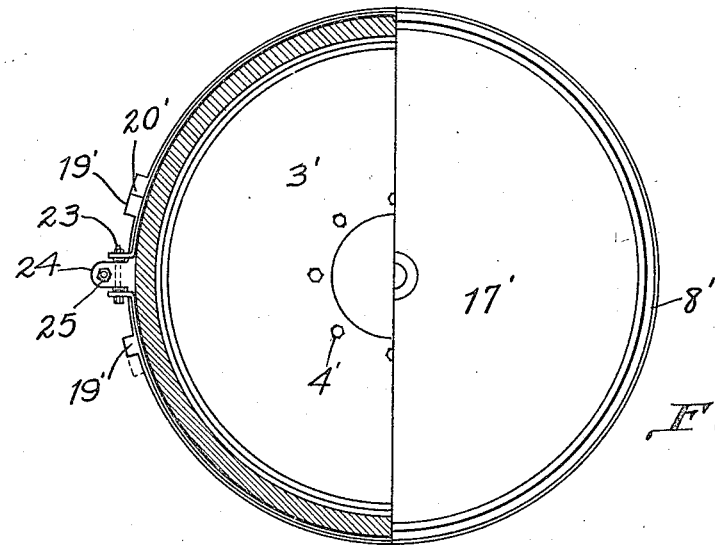
Figure 5:
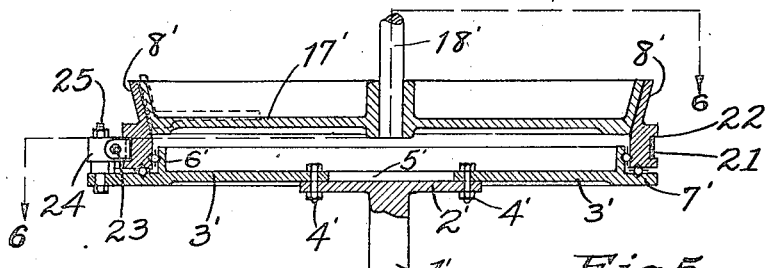
Figure 7:
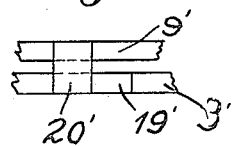

Figure 1 is a transverse sectional view, taken through my improved clutch mechanism, Figure 2 is a sectional view, taken on the line 2—2 of Figure 1, Figure 3 is a detail sectional view, illustrating the relative positions of the driven portions of the clutch, Figure 4 is a detail side elevation showing the relative positions of the stop lugs which limit the movement of the auxiliary portion of the driving part of the clutch, Figure 5 is a transverse sectional view, taken through the clutch member, illustrating a modified form of the invention, Figure 6 is a sectional view, taken on the line 6—6 of Figure 5, Figure 7 is a detail side elevation illustrating the relative positions of the lugs which limit the rotating movement of the movable member of the driving part of the clutch.

Referring now more particularly to the drawings, the numeral 1 indicates the shaft which is connected with the driving mechanism which is provided at its end with a plate 2, adapted to be bolted or otherwise secured to the driving portion of the clutch 3. The plate 2, in the present instance, is secured to the part 3 by means of the bolts 4. It will also be noted that the central portion of the driving part 3 is provided with an opening 5 and the plate 2 on the end of the shaft 1 is of sufficient diameter to entirely close this opening.

The member 3 is provided adjacent its outer edge with an upstanding flange 6 and the edge of the part 3 projects as at 7 beyond this flange 6 to form therewith a bearing flange upon which the movable part 8 of the clutch is mounted.

The movable part 8 of the clutch member is provided with an outstanding flange 9 disposed in opposed relation with the bearing flange 7 and arranged between these two flanges are the ball bearings 10, said bearings being disposed in suitable raceways 11 and 11' formed in the flanges 7 and 9 respectively. The upwardly extending portion 12 of the movable member 8 is also provided with a raceway 12' to receive the ball bearings 13 which are disposed between the portions 6 and 12 of the members 3 and 8 respectively, said bearings being arranged in the raceways 12' and 14 which are formed in the members 12 and 6 respectively. From this, it will be apparent that the member 8 is mounted for rotation with respect to the member 3 and securely held in its relative position.

The upstanding portion of the member 8 is provided with the cone-shaped flange 15 which is adapted to co-act with the cone-shaped portion 16 of the driven portion of the clutch 17, so that when the two members 15 and 16 are engaged with each other, the shaft 1 will be connected with the shaft 18, said shaft 18 being suitably connected with the driven parts of the machine so that movement can be readily imparted from the engine to the driven mechanism.

It will be noted that the member 3 is provided upon its flange portion 7 with a lug 19 and the member 8 is also provided with a lug 20, the lug 20 extending beyond the flange 9 and across the periphery of the flange 7 so that the lugs 19 and 20 cannot pass each other, whereby both parts 3 and 8 will move simultaneously when these lugs are engaged. It will be noted from the above construction that when the driving mechanism is pulling against the load, the lug 20 will be engaged with the lug 19 at one side thereof, but should the power be cut off (as, for example, in coasting an automobile wherein this invention is installed), the part 8 will rotate to bring the lug 20 into engagement with the opposite side of the lug 19, so that when it is again desired to take up the driving of the load, the part 3 will be rotated nearly a complete revolution before the lugs 19 and 20 are brought into engagement to bring the weight of the load against the driving mechanism.

In Figures 5 to 7, inclusive, I have illustrated a slightly modified form of invention, wherein a friction brake member is applied to the movable part 8' in the form of a band 21 arranged within a groove 22 formed in the exterior of the member 8', the ends of said band being connected by means of a bolt 23 to a lug 24, said lug in turn being connected to the flange 7' of the member 3' by means of the bolt 25. In this form of the invention, the member 3' is provided with stop lugs 19' arranged upon opposite sides of the lug 24 so that the lug 20' on part 8' will not pass beyond these lugs 19' and engage with any of the brake mechanism. This brake mechanism is particularly adapted for retarding the relative motion of the members 3' and 8' when they are approaching the position in which the driving and driven parts come into operative engagement, thus easing the strain or jar of the establishment of such operative engagement.

From the above description, taken in connection with the accompanying drawings, it will be readily apparent that I have provided a simple and durable clutch wherein the strain and jars, ordinarily incident to sudden relative variations in speed between the driving and driven portions of a mechanism involving a clutch, will be greatly lessened.

What I claim is:

1. A clutch mechanism of the class described, including a two-part driving portion and a driven portion, bearing flanges carried by one of the parts of the driving portion and bearing parts carried by the second part of the driving portion and disposed in opposed relation with the bearing parts of the first part of the driving portion, a lug member carried by one part of the driving portion and a lug member carried by the second part of the driving portion, the lug on the second part projecting beyond the periphery of one of the bearing flanges to engage with the lug on the first part whereby to permit an independent movement of one of the parts of the driving portion before taking up the load to be driven.

2. A clutch mechanism of the class described including a two-part driving portion and a driven portion, said driven portion and one of the driving parts having complementary frusto-conical frictional surfaces, the driven portion being adapted to nest within the latter, said driving part being rotatably mounted on the second driving part and radial lugs carried by said driving parts respectively adapted to engage and convey motion from the one to the other.

In testimony whereof I affix my signature.

JOHN JAMISON.